United States Patent Office 2,841,473
Patented July 1, 1958

2,841,473

PROCESS FOR REMOVING HEAVY METAL IONS FROM A NON-AQUEOUS SULFUR TRIOXIDE SOLUTION

Jacob Eichhorn, Saginaw, Mich., assignor to The Dow Chemical Company, Midland, Mich., a corporation of Delaware No Drawing. Application March 1, 1954
Serial No. 413,435

5 Claims. (Cl. 23—174)

This invention concerns an improved process for making alkenyl aromatic resin sulfonates by reaction of sulfur trioxide with poly(alkenyl-aromatic) compounds. It relates more particularly to a method of removing heavy metal ions from non-aqueous solutions of sulfur trioxide and a solvent comprising liquid sulfur dioxide and pertains especially to a procedure for employing such a solution of sulfur trioxide and sulfur dioxide in a process for carrying out the sulfonation of a toluene-soluble alkenyl aromatic resin to obtain a water-soluble resin sulfonate produce.

The term "sulfonate" employed herein refers to the water-soluble free sulfonic acid compounds obtained by sulfonation of appropriate polymers and copolymers of alkenyl aromatic compounds and to the water-soluble salts of such acids.

Sulfonated alkenyl aromatic resins and methods of making the same are well known. A commonly employed procedure is to react a sulfonating agent such as sulfuric acid, chlorosulfonic acid, or an ether complex of sulfur trioxide, with a polymer of an alkenyl aromatic compound while the polymer is dissolved in a liquid chlorinated aliphatic hydrocarbon solvent at a temperature between $-10°$ and $60°$ C. Harold H. Roth, in application Serial No. 272,888, filed February 21, 1952, now U. S. Patent No. 2,691,644, describes a procedure for sulfonating poly(alkenyl-aromatic) compounds, wherein sulfur trioxide is reacted with the polymer while the dry reactants are dissolved in a substantially anhydrous liquid solvent mixture of from 20 to 80 percent by weight of sulfur dioxide and from 80 to 20 percent of a polychlorinated aliphatic hydrocarbon such as methylene chloride, carbon tetrachloride, 1,1,1-trichloroethane, tetrachloroethylene, or ethylene dichloride, at a reaction temperature between $-20°$ and $40°$ C. The method may be employed in sulfonating polystyrene or other alkenyl aromatic resin to produce water-soluble alkenyl aromatic resin sulfonic acids, i. e. the method may be applied to introduce sulfonic acid radicals into the resin molecule. The properties of the sulfonated product may be varied by change in each of a number of reaction conditions such as by change in the relative proportions of the sulfur dioxide and the polychlorinated aliphatic hydrocarbon in the liquid reaction medium, by change in the polychlorinated aliphatic hydrocarbon employed, i. e. whether methylene chloride, carbon tetrachloride, tetrachloroethylene, 1,1,1-trichloroethane, or ethylene dichloride, or by change in the temperature conditions at which the reaction is carried out.

In carrying out the reaction for the sulfonation of an alkenyl aromatic resin such as polystyrene, polyvinyltoluene, or copolymers of styrene and vinyltoluene, it has been found that the presence of ions of a heavy metal, more particularly iron, or copper, or cations of salts of such metals, in the solution of the sulfur trioxide reactant has a pronounced catalytic effect to increase the tendency toward the formation of cross-links between the resin molecules. Mere traces of cations of the metals iron, or copper, or salts thereof, in admixture with the sulfur trioxide solution such as may be introduced by storage of a substantially anhydrous solution of the sulfur trioxide reactant in a liquid solvent, e. g. liquid sulfur dioxide, or a mixture of sulfur dioxide and a polychlorinated aliphatic hydrocarbon, in an iron, copper, or steel, vessel, for several hours, or by prolonged contact of the solution with pipes or conduits of such metals, prior to admixture with a solution of the polymer starting material in a polychlorinated aliphatic hydrocarbon solvent, or a liquid mixture of sulfur dioxide and a polychlorinated aliphatic hydrocarbon, are usually sufficient to cause a substantial change in the properties of the sulfonated polymer from those of the product obtained in the absence of the metal ions under otherwise similar conditions.

It has further been found that cations of heavy metals, or cations of salts of heavy metals, such as iron, copper, or lead, can readily be removed from an anhydrous or substantially anhydrous solution of sulfur trioxide dissolved in a non-aqueous solvent medium such as liquid sulfur dioxide, or a liquid mixture of a major proportion of sulfur dioxide and a minor proportion of a polychlorinated aliphatic hydrocarbon, by contacting the solution with an alkali metal salt form of a cation exchange resin.

It has also been found that by contacting a solution of sulfur trioxide dissolved in anhydrous or substantially anhydrous liquid sulfur dioxide with an alkali metal salt form of a cation exchange resin, whereby cations of the metals, iron, or copper, or cations of salts of such metals, are sorbed by the resin and are removed from the solution, and thereafter feeding the solution of the sulfur trioxide into admixture with a solution of a polymer of an alkenyl aromatic compound dissolved in a substantially anhydrous liquid polychlorinated aliphatic hydrocarbon solvent, or a solvent comprising sulfur dioxide, that reaction between the sulfur trioxide and the polymer proceeds rapidly and smoothly toward the formation of a water-soluble sulfonated polymer product without concurrent formation of any appreciable amount of cross-linking between the polymer molecules.

It appears that the cations of the metals iron, or copper, or cations of salts of such metals, have a pronounced catalytic action to effect the formation of substantial cross-linking between the polymer molecules during the sulfonation reaction when such cations of the metals or their salts are in admixture with, or dissolved in, a solution of the sulfur trioxide reactant in liquid sulfur dioxide.

The formation of heavy metal ions in the sulfur trioxide solution appears to occur for the most part by reaction of the sulfur trioxide with the metal container or conduits with which it is in contact. The reaction proceeds at a relatively slow rate under anhydrous or substantially anhydrous conditions, i. e. in the presence of not more than trace amounts of water, at ordinary temperatures. In general, storage or contact of a substantially anhydrous solution of sulfur trioxide in liquid sulfur dioxide with metals such as iron, copper, or stainless steel, storage vessels or conduits, at room temperature or below, for a period of several, e. g. from 2 to 5, hours, or longer, results in the formation of sufficient iron or copper ions in said solution to produce an appreciable change in the properties of the sulfonated polymer from those of the product obtained by reaction of sulfur trioxide with a poly(alkenyl-aromatic) compound in the absence of the metal ions under otherwise similar conditions.

After removal of cations of the metals, iron, or copper, or cations of salts of such metals, or mixtures of such ions of the metals or their salts, from a solution of the sulfur trioxide reactant in liquid sulfur dioxide by contacting the substantially anhydrous solution with an alkali metal salt form of a cation exchange resin, the treated solution can be maintained in contact with metals such as iron pipe, or copper or stainless steel tubes, for a limited time, e. g. for a time of 30 minutes or less, without the formation of any appreciable amount of ions of the metals in the treated solution. Thus, the treated sulfur trioxide solution can be fed via metal conduits, e. g. iron pipe or copper tubes, into admixture with a solution of a polymer of an alkenyl aromatic compound dissolved in a liquid polychlorinated aliphatic hydrocarbon, or a substantially anhydrous solvent comprising sulfur dioxide, in a suitable reaction zone. The sulfonation reaction, i. e. reaction of the sulfur trioxide with the polymer, can readily be carried out in an iron, copper, or stainless steel, vessel without concurrent formation of any appreciable amount of cross-links between the polymer molecules, resulting from the occurrence of heavy metal ions in the reaction medium by reaction of the sulfur trioxide with walls or interior surfaces of the vessel.

It has also been found that the reaction for the sulfonation of a poly(alkenyl-aromatic) compound with sulfur trioxide in a liquid reaction medium of from 20 to 80 percent by weight of sulfur dioxide and from 80 to 20 percent of a polychlorinated aliphatic hydrocarbon such as methylene chloride, carbon tetrachloride, 1,1,1-trichloroethane, tetrachloroethylene, or ethylene dichloride, can readily be carried out so as to regulate or control the degree of cross-linking in the sulfonated polymer product which is obtained. More specifically, a solution of sulfur trioxide in liquid sulfur dioxide, preferably in concentration of from 0.5 to 5 percent by weight of the sulfur trioxide based on the weight of the solution, is passed through a bed of an alkali metal salt form of a cation exchange resin, whereby cations of the metals, iron, or copper, or cations of salts of such metals, are removed from the solution. Thereafter, the solution is passed, in whole, or in part, through a bed of a cation exchange resin in the iron, or copper form, whereby a controlled amount of iron, or copper, ions are introduced into the solution of the sulfur trioxide reactant. The solution of the sulfur trioxide reactant is fed into admixture with a solution of an alkenyl aromatic resin in a polychlorinated aliphatic hydrocarbon solvent and the sulfur trioxide reacted with the resin to obtain a sulfonated resin product. By such procedure the degree of cross-linking between the resin molecules can be readily controlled by the introduction of a regulated amount of iron or copper ions into the reaction mixture during the sulfonating reaction to obtain a sulfonated resin product having a desired viscosity characteristic, i. e. a desired degree of cross-links between the polymer molecules.

Any cation exchange resin containing sulfonic acid, or carboxylic acid, groups as the functional groups of the same can be employed in the process. Examples of suitable cation exchange resins are the resinous condensation products of phenolsulfonic acid, or a salt thereof, and formaldehyde, sulfonated coal, or sulfonated benzene-insoluble vinyl aromatic resins such as sulfonated copolymers of styrene and divinylbenzene, or sulfonated copolymers of styrene, ethylvinylbenzene and divinylbenzene, or carboxylic acid type cation exchange resins. Cation exchange resins containing sulfonate groups are preferred. The cation exchange resins are employed in the form of an alkali metal salt, preferably the sodium salt of the hydrogen form of the cation exchange resin for removing ions of heavy metals such as iron or copper or cations of salts of such metals from non-aqueous solutions of the sulfur trioxide reactant. The cation exchange resin is usually employed in dry or substantially dry form, although the resin may contain a limited amount, e. g. 10 percent by weight or less, of water in the resin granules. The cation exchange resin is usually dried in air at atmospheric, or subatmospheric pressure, and at temperatures up to 125° C. prior to its use in the process.

In practice, a solution composed of from 0.5 to 5 percent by weight of sulfur trioxide dissolved in liquid sulfur dioxide, or in a mixture of from 50 to 99 percent by weight of sulfur dioxide and from 50 to 1 percent of a polychlorinated aliphatic hydrocarbon selected from the group consisting of methylene chloride, carbon tetrachloride, 1,1,1-trichloroethane, tetrachloroethylene and ethylene dichloride, which solution contains ions of heavy metals such as iron, or copper, or cations of salts of such metals, usually picked up by storage of the solution in a holding vessel of iron, steel, or copper, or by passage of the solution through metal conduits, is passed through a bed of an alkali metal salt form of a cation exchange resin, whereby ions of the heavy metals iron, or copper, or cations of salts of such metals, are sorbed by the resin and are removed from the solution. The ions of the heavy metals and cations of salts of the metals appear to be chemically combined with the resin, i. e. sorption of the ions of the metals or cations of the salts of the metals appears to involve an ion exchange reaction. The resin can be regenerated to its alkali metal form in usual ways, e. g. by treating or washing the same with an aqueous solution of sodium chloride, sodium sulfate, or potassium chloride, or by washing with a dilute aqueous solution of hydrochloric acid, or sulfuric acid, followed by washing with an aqeuous solution of an alkali, or a salt thereof, and rinsing with water. The regenerated resin is dried and is in a form suitable for re-employment for sorbing ions of heavy metals, or cations of salts of heavy metals, from another portion of the solution.

The anhydrous solution of the sulfur trioxide which has been treated to free it from ions of heavy metals or cations of salts of such metals can advantageously be employed in effecting the nuclear sulfonation of any benzene-soluble resinous or resin-forming polynuclear aromatic substance, e. g. indene resins, soluble phenol-formaldehyde condensation products, or thermoplastic alkenyl aromatic resins such as polystyrene, polyvinyltoluene, or copolymers of styrene and vinyltoluene. The polynuclear aromatic substance which is to be sulfonated may be of any desired molecular weight and alkenyl aromatic resins, or polystyrene, ranging from the dimers up to molding grades having molecular weights as high as 500,000, or greater, can be sulfonated with the treated solution to obtain water-soluble resin or polymer sulfonates without concurrent formation of any appreciable amount of cross-links between the polymer molecules.

It may be mentioned that the solution of the sulfur trioxide which has been treated with the cation exchange resin to remove ions of the metals iron or copper or cations of salts of such metals from the solution is most advantageously employed for preventing or curtailing the formation of cross-links between the polymer molecules in effecting the nuclear sulfonation of an alkenyl aromatic resin having a molecular weight of at least 20,000 or greater, preferably a molecular weight between 50,000 and 500,000. The effect of cross-linking between the polymer molecules, produced by ions of the metals iron or copper or cations of salts of such metals in the sulfur trioxide solution, or reaction mixture, results in little change in the properties of the sulfonated polymer product when the polymer starting material has a molecular weight of about 20,000 or lower.

In a preferred practice for carrying out the nuclear sulfonation of a poly(alkenyl-aromatic) compound, polystyrene or other resinous polynuclear substance is dissolved in a polychlorinated aliphatic hydrocarbon such as methylene chloride, carbon tetrachloride, 1,1,1-trichloroethane, tetrachloroethylene, or ethylene dichloride, to form a solution containing from 0.5 to 5 percent by weight of the polymer. The solution is stirred and maintained at a temperature between −20° and 40° C. A solution of from 0.5 to 5 percent by weight of sulfur trioxide dissolved in liquid sulfur dioxide, which solution has been pre-treated by passage through a bed of an alkali metal salt form of a cation exchange resin to remove ions of heavy metals, is added with stirring. The solution of the polymer and the solution of the sulfur trioxide reactant are usually mixed with one another in proportions such that the solvent reaction medium contains from 20 to 80 percent by weight of sulfur dioxide and from 80 to 20 percent of a polychlorinated aliphatic hydrocarbon. The addition is preferably made quite rapidly, e. g. over a period of from 1 to 20 minutes and usually about 10 minutes or less. The reaction is carried out at a pressure sufficient to maintain a major proportion of the solvent mixture in liquid condition. When employing a reaction temperature of about −1° C. or lower, the reaction can be carried out at atmospheric pressure, but when employing a reaction temperature of from 10° to 40° C. a moderate pressure, e. g. of up to 80 pounds per square inch gauge pressure, or thereabout, may be required to maintain the solvent mixture in liquid condition. In most instances it is advantageous to carry the reaction out in a pressure-resistant vessel and at a pressure greater than atmospheric pressure.

The proportion of sulfur trioxide which is employed in the reaction may be varied widely, e. g. the sulfur trioxide may be used in a proportion as small as that theoretically required for the introduction of 0.1 sulfonate radical per aromatic nucleus of the polymer starting material. The sulfur trioxide is usually employed in a proportion corresponding to that theoretically required for the introduction of at least 0.6, preferably from 0.6 to 1.1, sulfonic acid radical per aromatic nucleus in the polymer starting material in order to obtain a water-soluble sulfonated polymer product. The solvent mixture is preferably used in a proportion such that the combined weight of the sulfur trioxide and the polymer starting materials corresponds to from 0.5 to 5 percent by weight of the entire reaction mixture. The employment of the reactants and solvent mixture in these proportions usually results in formation of a slurry of the sulfonated polymer product that is flowable and conveniently handled, and facilitates production of a sulfonated alkenyl aromatic resin product of good quality.

The reaction for sulfonation of the resin occurs rapidly and proceeds nearly to completion within a few seconds after bringing the reactants into admixture with one another. A slight amount of further sulfonation usually occurs on permitting the mixture to stand for a short time, e. g. for 10 minutes or longer.

The sulfonated resin product may be separated from the liquid reaction medium in usual ways. When the method is applied to sulfonating an alkenyl aromatic resin, the resin sulfonic acid usually precipitates in a granular condition as it is formed, and can be separated from the reaction mixture by filtering. The granular product is usually obtained in a form nearly free from unreacted sulfur trioxide. It may advantageously be washed with liquid sulfur dioxide or with the aforementioned mixed solvent comprising sulfur dioxide, e. g. a mixture of a major proportion by weight of sulfur dioxide and a minor proportion of a polychlorinated aliphatic hydrocarbon, to remove remaining traces of sulfur trioxide.

The sulfonation process may be carried out batch-wise, but the reaction becomes more difficult as the size of the batch is increased from that of a laboratory scale to a semi-plant, or production on a commercial scale. However, the process can be carried out in continuous manner by feeding a stream of the pre-treated solution of sulfur trioxide in liquid sulfur dioxide or in the aforementioned mixed solvent, and a stream of a solution of the polymer starting material in another portion of such mixed solvent, or preferably a polychlorinated aliphatic hydrocarbon solvent, into admixture with one another to form a reaction mixture containing all of the starting ingredients in the relative proportions hereinbefore specified. The mixture is usually formed at temperatures between −20° and 40° C. and at a pressure sufficient to maintain a major proportion of the solvent mixture in liquid condition. The sulfonation reaction occurs almost instantaneously upon bringing the reactants into admixture with one another and the sulfonated resin product usually separates in granular condition as it is formed. Accordingly, the sulfonation mixture may be passed quite rapidly through a reaction zone and thence to a filtering device for separating the product.

The following examples illustrate ways in which the principle of the invention has been applied but are not to be construed as limiting its scope.

EXAMPLE 1

A portion of a batch of a copolymer containing in chemically combined form 50 percent by weight of styrene and 50 percent vinyltoluene, which copolymer had a viscosity characteristic of 38 centipoises (determined on a 10 weight percent solution of the copolymer in toluene at 25° C.), was dissolved in carbon tetrachloride in proportions corresponding to 1.4 parts by weight of the copolymer per 100 parts by weight of the carbon tetrachloride. One part by weight of sulfur trioxide was dissolved in 100 parts by weight of liquid sulfur dioxide under pressure in a steel holding vessel. The solution of the copolymer and the solution of the sulfur trioxide were concurrently fed into admixture with one another at atmospheric pressure in a reaction vessel comprising a 4-inch internal diameter steel pot approximately 5.25 inches long equipped with a stirrer and overflow outlet, wherein the mixture was maintained at a temperature between −6° C. and −7° C. for a reaction time of from 5 to 6 minutes. By reaction time is meant the time required for an infinitesimal portion of the mixture to traverse the reaction zone from point of feed of the solutions of the reactants into admixture with one another in said vessel to point of discharge or overflow of the reacted mixture from said vessel. The solution of the copolymer in the carbon tetrachloride was fed to the reaction at a rate of 20 pounds of the solution per hour. The solution of the sulfur trioxide in the liquid sulfur dioxide was withdrawn from the holding vessel and was passed through a bed of the sodium form of a cation exchange resin comprising a sulfonated copolymer of approximately 87 percent by weight styrene, 5 percent ethylvinylbenzene and 8 percent divinylbenzene, prior to feeding the sulfur trioxide solution into admixture with the solution of the copolymer in the reaction vessel. The cation exchange resin was dried in air at room temperature prior to use in the experiment. The sulfur trioxide solution was fed to the reaction at a rate of 20.5 pounds of the solution per hour. The experiment was carried out by concurrently feeding the solutions of the reactants into admixture with one another in the reaction vessel in the aforementioned proportions and continuously discharging the reacted mixture from said vessel over a period of 8.5 hours. The sulfonated copolymer product precipitated from the solvent reaction medium as it was formed. The sulfonated product was recovered by filtering the reacted mixture and was dried. Aliquot portions of the copolymer sulfonate product were collected at successive intervals during the experiment. A portion of the dried sulfonated product was dissolved in water to form a solution containing 0.5 percent by weight of the product. The viscosity of the solution in centipoises at 25° C. was determined employing a Brookfield viscosimeter. After continuing the experiment for 3.5 hours while passing the solution of the sulfur trioxide reactant through the bed of the cation exchange resin, the bed was by-passed and the solution of sulfur trioxide dissolved in liquid sulfur dioxide fed directly from the holding vessel into the reaction vessel and into admixture with the solution of the copolymer in the aforementioned proportions for a period of 2 hours. Thereafter, the solution of the sulfur trioxide in the liquid sulfur dioxide was passed through the bed of the cation exchange resin for the remainder of the experiment. Table I identifies each aliquot portion by "Test No.," and gives the time in minutes after start of the experiment when the aliquot portion was collected. The table gives the temperature at which the reaction was carried out. The table also gives a viscosity characteristic for the product expressed as centipoises at 25° C. for an aqueous 0.5 percent by weight solution of the acidic sulfonated copolymer in water. The viscosity of the solution represents an indirect but easily determined measurement of the degree of cross-links between the polymer molecules in the sulfonate product. An increase in viscosity represents an increase in the cross-links between the polymer molecules.

Table I

| Aliquot Portion | | Temp., ° C. | Product—Viscosity, cps. |
|---|---|---|---|
| Test No. | Time, Hrs. | | |
| 0 | 0 | −6 | |
| 1 | 1 | −6 | 15 |
| 2 | 1.5 | −6 | 16 |
| 3 | 2.0 | −6 | 20 |
| 4 | 2.5 | −6 | 18 |
| 5 | 3.0 | −7 | 25 |
| 6 | 3.5 | −7 | 36 |
| 7 | 4.0 | −7 | 130 |
| 8 | 4.5 | −7 | 265 |
| 9 | 5.0 | −7 | 206 |
| 10 | 5.5 | −7 | 420 |
| 11 | 6.0 | −7 | 250 |
| 12 | 6.5 | −7 | 55 |
| 13 | 7.0 | −7 | 50 |
| 14 | 7.5 | −7 | 31 |
| 15 | 8.0 | −7 | 45 |
| 16 | 8.5 | −7 | 20 |

EXAMPLE 2

A portion of the batch of the copolymer of styrene and vinyltoluene described in Example 1 was dissolved in methylene chloride to form a solution containing 1.4 parts by weight of the copolymer per 100 parts of the methylene chloride. The solution of the copolymer and a solution of liquid sulfur dioxide containing one part by weight of sulfur trioxide per 100 parts of the sulfur dioxide were fed into admixture with one another at rates corresponding to 0.8 part by weight of the copolymer solution per part of the sulfur oxides in a reaction vessel similar to that described in Example 1, wherein the mixture was maintained at a temperature of −1° C. for a reaction time of approximately 8 minutes. The liquid sulfur dioxide containing the sulfur trioxide was withdrawn from a holding vessel and passed through a bed of the sodium form of a carboxylic acid type cation exchange resin prior to its being fed into admixture with the solution of the copolymer in the reaction vessel. The experiment was carried out by feeding the reactants into admixture with one another in the reaction zone and continuously discharging the reacted mixture therefrom over a period of 4.75 hours. Aliquot portions of the reacted mixture were collected at successive intervals during the experiment. Each aliquot portion was filtered to recover the sulfonate product. The product was dried. A portion of the dried sulfonate product was dissolved in water to form a solution containing 0.5 percent by weight of said product. The viscosity of the solution was determined at 25° C. After continuing the experiment for 3 hours while passing the liquid sulfur dioxide-sulfur trioxide solution through the bed of the sodium form of the carboxylic acid type cation exchange resin, the bed was by-passed and the SO₂—SO₃ solution fed directly from the holding vessel to the reaction vessel for a period of 1 hour and 45 minutes. Table II identifies each aliquot portion of the reacted mixture by "Test No.," and gives the time in hours after start of the experiment when the aliquot portion was collected. The table gives the viscosity in centipoises of an aqueous solution containing 0.5 percent by weight of the acidic sulfonated product at 25° C.

Table II

| Aliquot Portion | | Product—Viscosity, cps. |
|---|---|---|
| Test No. | Time, Hrs. | |
| 0 | 0 | |
| 1 | 0.5 | 23 |
| 2 | 1 | 25 |
| 3 | 1.5 | 24 |
| 4 | 2 | 35 |
| 5 | 2.5 | 28 |
| 6 | 3 | 30 |
| 7 | 3.5 | 73 |
| 8 | 4 | 115 |
| 9 | 4.25 | 120 |
| 10 | 4.5 | 115 |
| 11 | 4.75 | 105 |

Similar results were obtained in a second experiment employing a bed of the sodium form of a phenolsulfonic acid formaldehyde condensation type cation exchange resin in place of the carboxylic acid type cation exchange resin employed in the above experiment.

EXAMPLE 3

The sodium form of a batch of a cation exchange resin composed of a sulfonated copolymer of approximately 87 percent by weight styrene, 5 percent ethylvinylbenzene and 8 percent divinylbenzene, was dried in air at room temperature and placed in a 2-inch internal diameter steel tube to form a bed of the resin 8.5 inches deep. The cation exchange resin was in the form of discrete particles of sizes from 50 to 100 mesh per inch as determined by U. S. standard screens. The resin was analyzed and found to contain 3 parts by weight of copper, 23 parts of iron and 4 parts of lead per million parts by weight of the resin. The bed of the resin was employed in an experiment for the sulfonation of a copolymer of 50 percent by weight styrene and 50 percent vinyltoluene by procedure similar to that described in Example 1, wherein liquid sulfur dioxide containing one part by weight of sulfur trioxide per 100 parts by weight of the sulfur dioxide was withdrawn from a steel holding vessel and passed through the bed of the cation exchange resin prior to its being fed into admixture with a solution of the copolymer in a polychlorinated aliphatic hydrocarbon solvent in a reaction zone. After completing the experiment, the cation exchange resin was removed from the tube, washed with water and dried. The resin was analyzed and found to contain 26 parts by weight of copper, 220 parts of iron and 5 parts of lead per million parts of the resin.

In a second experiment, another bed of the sodium form of the cation exchange resin was employed in successive experiments for the sulfonation of a copolymer of 50 percent by weight styrene and 50 percent vinyltoluene, until leakage of ions of heavy metals through the bed of the resin occurred. The resin was removed from the tube, washed with water and dried. The resin was analyzed and found to contain 155 parts by weight of copper, 680 parts of iron and 16 parts of lead per million parts by weight of the resin.

EXAMPLE 4

A charge of 1.4 pounds of a batch of polyvinyltoluene, prepared by polymerizing a mixture of approximately 65 percent by weight of meta-vinyltoluene and 35 percent paravinyltoluene in bulk, which polymer had a viscosity characteristic of 921 centipoises (determined on a 10 weight percent solution of the polymer in toluene at 25°

C.), was dissolved in 100 pounds of methylene chloride. A charge of one pound of sulfur trioxide was mixed with 100 pounds of liquid sulfur dioxide and stored in a steel holding vessel at room temperature for a period of 65 hours. The solution of the polyvinyltoluene was fed to a reaction vessel similar to that described in Example 1, at a rate of 16.7 pounds of the solution per hour. The liquid sulfur dioxide containing the sulfur trioxide was withdrawn from the holding vessel and was passed through a bed of the sodium form of a cation exchange resin, consisting of a sulfonated copolymer of approximately 87 percent by weight styrene, 5 percent ethylvinylbenzene and 8 percent divinylbenzene, and fed to the reaction vessel at a rate of 17.2 pounds per hour, concurrently, and into admixture with, the solution of the polyvinyltoluene, in which reaction vessel the mixture was maintained at a temperature of $-2°$ C. for a reaction time of from 5 to 6 minutes. The solution of the polyvinyltoluene and the solution of the liquid sulfur dioxide containing the sulfur trioxide were fed to the reaction vessel and the reacted mixture discharged therefrom in continuous manner over a period of 4.5 hours. Aliquot portions of the reacted mixture were collected at successive intervals during the experiment. Each aliquot portion of the reacted mixture was filtered to separate and recover the sulfonate product. The product was dried. A portion of the sulfonated polymer product was dissolved in water to form an aqueous solution containing 0.5 percent by weight of the acidic sulfonated product. The viscosity of the solution in centipoises at 25° C. was determined employing a Brookfield viscosimeter. After continuing the experiment for 2 hours, while passing the liquid sulfur dioxide solution of sulfur trioxide through the bed of the sodium form of the cation exchange resin, the resin bed was by-passed and the sulfur dioxide-sulfur trioxide solution fed directly from the holding vessel into admixture with the solution of the polyvinyltoluene in the reaction vessel for the remainder of the experiment. Table III identifies each aliquot portion of the reacted mixture by "Test No." and gives the time in hours after start of the experiment when it was collected. The table also gives a viscosity characteristic for the acidic sulfonate product expressed as centipoises for an aqueous 0.5 percent by weight solution of the sulfonated polymer product in water at 25° C.

*Table III*

| Aliquot Portion | | Product—Viscosity, cps. |
|---|---|---|
| Test No. | Time, Hrs. | |
| 0 | 0 | |
| 1 | 1 | 73 |
| 2 | 1.5 | 66 |
| 3 | 2 | 85 |
| 4 | 2.5 | 120 |
| 5 | 3 | 184 |
| 6 | 3.5 | 260 |
| 7 | 4 | 244 |
| 8 | 4.5 | 186 |

EXAMPLE 5

In each of two experiments, a charge of 1.4 pounds of the batch of the polyvinyltoluene described in Example 4, was dissolved in 100 pounds of methylene chloride. A charge of one pound of sulfur trioxide was mixed with 100 pounds of liquid sulfur dioxide and stored in a steel holding vessel for a period of 16 hours. Thereafter, the solution of the sulfur trioxide was withdrawn from the holding vessel and passed through a bed of the sodium form of a cation exchange resin similar to that described in Example 3, at a rate corresponding to 17.2 pounds of the solution per hour and fed to a reaction vessel similar to that described in Example 1, concurrently with feed to the reaction vessel of the solution of the polyvinyltoluene in the methylene chloride at a rate of 17.5 pounds of the latter solution per hour. The mixture was stirred and maintained at a temperature of $-2°$ C. in the vessel for a reaction time of approximately 6 minutes. The experiment was carried out with continuous feed of the solutions of the starting materials to the reaction vessel and withdrawal of the reacted mixture therefrom via the overflow outlet over a period of 5 hours. The sulfonated polymer product precipitated from the liquid reaction medium as it was formed. The product was separated from the liquid by filtering. It was washed with liquid sulfur dioxide and dried in air at room temperature. After continuing the experiment for 2.5 hours, aliquot portions of the sulfonated polymer product were collected at successive intervals during the remainder of the experiment. A part of each aliquot portion of the sulfonated polymer product was dissolved in water to form a solution containing 0.5 percent by weight of said product. The viscosity of the solution was determined at 25° C. employing a Brookfield viscosimeter. The viscosity in centipoises of a solution of the sulfonated polymer in water constitutes an indirect, but easily determined measurement of the degree of cross-linking in the product. Table IV identifies each aliquot portion of the sulfonated polymer product by "Test No." and gives the time in hours after start of the experiment when it was collected. The table also gives a viscosity charatceristic for the sulfonated product expressed as centipoises for an aqueous 0.5 weight percent solution of the dried product in distilled water at 25° C.

*Table IV*

| Aliquot Portion | | Product—Viscosity at 250° C. cps. |
|---|---|---|
| Test No. | Time, Hrs. | |
| 1 | 2.5 | 80 |
| 2 | 3.0 | 71 |
| 3 | 3.5 | 87 |
| 4 | 4.0 | 74 |
| 5 | 4.5 | 71 |
| 6 | 5.0 | 70 |

In the second experiment employing similar solutions of the polyvinyltoluene and the sulfur trioxide starting materials, the solution of the sulfur trioxide reactant dissolved in the liquid sulfur dioxide was withdrawn from the holding vessel and passed through a bed of the iron (ferric) form of a cation exchange resin composed of a sulfonated copolymer of styrene, ethylvinylbenzene and divinylbenzene similar to that described in Example 4, to introduce iron ions into the solution prior to mixing the solution of the sulfur trioxide reactant with the solution of the polyvinyltoluene starting material in the reaction vessel. The reaction was carried out and the sulfonated polymer product separated from the reacted mixture as previously described. Table V identifies each aliquot portion of the sulfonated polymer product by "Test No." and gives the time in hours after start of the experiment when it was collected. The table also gives a viscosity characteristic for the sulfonated product, expressed as centipoises for an aqueous 0.5 percent by weight solution of the dried product in distilled water at 25° C.

*Table V*

| Aliquot Portion | | Product—Viscosity, cps. |
|---|---|---|
| Test No. | Time, Hrs. | |
| 1 | 2.5 | 139 |
| 2 | 3.0 | 128 |
| 3 | 3.5 | 155 |
| 4 | 4.0 | 128 |
| 5 | 4.5 | 122 |
| 6 | 5.0 | 140 |

I claim:

1. A process for removing heavy metal ions from a nonaqueous sulfur trioxide solution, which comprises passing a substantially anhydrous solution of sulfur trioxide dissolved in a liquid solvent selected from the group consisting of sulfur dioxide and mixtures of a major proportion by weight of sulfur dioxide and a minor proportion of at least one polychlorinated aliphatic hydrocarbon selected from the group consisting of methylene chloride, carbon tetrachloride, 1,1,1-trichloroethane, tetrachloroethylene and ethylene dichloride, said solution containing heavy metal ions, into contact with an alkali metal salt form of a cation exchange resin selected from the group consisting of cation exchange resins containing sulfonic acid groups and cation exchange resins containing carboxylic acid groups as the functional groups of the same, whereby the heavy metal ions are sorbed by the resin and are removed from the solution.

2. A process for removing heavy metal ions from a liquid mixture of sulfur dioxide and sulfur trioxide, which comprises passing a substantially anhydrous solution of sulfur trioxide dissolved in liquid sulfur dioxide, said solution containing heavy metal ions, into contact with an alkali metal salt form of a cation exchange resin selected from the group consisting of cation exchange resins containing sulfonic acid groups and cation exchange resins containing carboxylic acid groups as the functional groups of the same, whereby the heavy metal ions are sorbed by the resin and are removed from the solution.

3. A process for removing metal ions of dissolved iron salts from a liquid mixture of sulfur dioxide and sulfur trioxide, which comprises passing a substantially anhydrous solution of trioxide dissolved in liquid sulfur dioxide containing a dissolved iron salt into contact with an alkali metal salt form of a cation exchange resin selected from the group consisting of cation exchange resins containing sulfonic acid groups and cation exchange resins containing carboxylic acid groups as the functional groups of the same, whereby the cations of the iron salt are sorbed by the resin and are removed from the solution.

4. A process as claimed in claim 3, wherein the cation exchange resin contains sulfonic acid groups as the functional groups of the same.

5. A process as claimed in claim 3, wherein the cation exchange resin is an insoluble sulfonated copolymer of a predominant amount of styrene and a minor proportion of ethylvinylbenzene and divinylbenzene.

References Cited in the file of this patent

UNITED STATES PATENTS

| | | |
|---|---|---|
| 2,340,111 | D'Alelio | Jan. 25, 1944 |
| 2,669,557 | Wheaton | Feb. 16, 1954 |
| 2,718,514 | Fantl | Sept. 20, 1955 |
| 2,763,634 | Feot | Sept. 18, 1956 |

UNITED STATES PATENT OFFICE

CERTIFICATE OF CORRECTION

Patent No. 2,841,473                                    July 1, 1958

Jacob Eichhorn

It is hereby certified that error appears in the printed specification of the above numbered patent requiring correction and that the said Letters Patent should read as corrected below.

Column 1, line 25, for "produce" read -- product --; column 10, line 33, Table IV, heading to last column, for "Product-Viscosity at 250° C. cps." read -- Product-Viscosity at 25° C. cps. --; column 12, line 3, before "trioxide" insert -- sulfur --.

Signed and sealed this 28th day of July 1959.

(SEAL)
Attest:

KARL H. AXLINE
Attesting Officer

ROBERT C. WATSON
Commissioner of Patents